US012210985B2

(12) United States Patent
Bonnington et al.

(10) Patent No.: US 12,210,985 B2
(45) Date of Patent: Jan. 28, 2025

(54) WORKSITE INEFFICIENCY IDENTIFICATION

(71) Applicant: Site Vantage, Inc., Westport, CT (US)

(72) Inventors: Shawn Bonnington, Trinity, FL (US); Adnan Aziz, Frisco, TX (US)

(73) Assignee: Site Vantage, Inc., Westport, CT (US)

( * ) Notice: Subject to any disclaimer, the term of this patent is extended or adjusted under 35 U.S.C. 154(b) by 29 days.

(21) Appl. No.: 17/697,790

(22) Filed: Mar. 17, 2022

(65) Prior Publication Data

US 2023/0297900 A1    Sep. 21, 2023

(51) Int. Cl.
*G06Q 10/047* (2023.01)
*G06Q 10/0631* (2023.01)
*G07C 5/06* (2006.01)

(52) U.S. Cl.
CPC ..... *G06Q 10/047* (2013.01); *G06Q 10/06315* (2013.01); *G06Q 10/06316* (2013.01); *G07C 5/06* (2013.01)

(58) Field of Classification Search
CPC ............ G06Q 10/047; G06Q 10/06316
See application file for complete search history.

(56) References Cited

U.S. PATENT DOCUMENTS

| | | | | |
|---|---|---|---|---|
| 8,065,342 | B1* | 11/2011 | Borg | G06Q 10/0631 455/566 |
| 2008/0059411 | A1* | 3/2008 | Greiner | G06Q 10/06 |
| 2008/0208393 | A1* | 8/2008 | Schricker | G08G 1/20 701/1 |
| 2008/0208415 | A1* | 8/2008 | Vik | E21C 41/26 701/50 |
| 2011/0288769 | A1* | 11/2011 | Gudat | G01C 21/343 701/532 |
| 2017/0109945 | A1* | 4/2017 | Hague | H04B 7/2606 |
| 2018/0211204 | A1* | 7/2018 | Bruns | G06Q 10/087 |
| 2021/0124359 | A1* | 4/2021 | Wei | E02F 9/205 |
| 2022/0259822 | A1* | 8/2022 | Subramanian | E02F 9/205 |
| 2022/0334584 | A1* | 10/2022 | Jang | G05D 1/0027 |
| 2023/0186191 | A1* | 6/2023 | Lane | G01R 31/371 705/7.13 |

OTHER PUBLICATIONS

Soltani et al, A fuzzy based multi-objective path planning of construction sites, Automation in Construction vol. 13, Issue 6, Nov. 2004, pp. 717-734 (Year: 2004).*

(Continued)

*Primary Examiner* — Andre D Boyce
(74) *Attorney, Agent, or Firm* — Edell, Shapiro & Finnan, LLC (57) ABSTRACT

Systems and methods to identify inefficiencies in a worksite and generate recommended actions to improve the inefficiencies are provided herein. The inefficiencies may be identified by analyzing equipment data from mobile equipment and fixed equipment associated with the worksite. The equipment data may be used to generate one or more routes through the worksite. The equipment data and one or more routes may be used to generate a cycle time for the worksite. The equipment data, one or more routes, and cycle time may be used to identify an inefficiency in the worksite, and the identified inefficiency may be used to generate a recommended action to improve and thus remedy the inefficiency.

8 Claims, 8 Drawing Sheets

(56) References Cited

OTHER PUBLICATIONS

Pradhananga, Nipesh, and Jochen Teizer. "Cell-based construction site simulation model for earthmoving operations using real-time equipment location data." Visualization in Engineering 3 (2015): 1-16. (Year: 2015).*

Akhavian, Reza, and Amir H. Behzadan. "Construction equipment activity recognition for simulation input modeling using mobile sensors and machine learning classifiers." Advanced Engineering Informatics 29.4 (2015): 867-877. (Year: 2015).*

* cited by examiner

WORKSITE INEFFICIENCY IDENTIFICATION

BACKGROUND

Technical Field

The present disclosure relates generally to data communications, and more particularly, to utilizing sensor data to detect worksite inefficiencies and cause changes operating parameters of worksite equipment.

Description of the Related Art

Worksites typically include, or are associated with, many different pieces of equipment of varying types. The interactions between the worksite equipment, as well as between the equipment and the area around the worksite, may affect the overall efficiency of the worksite or the individual efficiency of the equipment. Some worksites have tried to use workers to manually identify inefficiencies, but these workers are generally unaware of the totality of impacts caused by equipment or the worksite itself. It is with respect to these and other considerations that the embodiments described herein have been made.

BRIEF SUMMARY

Briefly described, embodiments are directed toward systems and methods of identifying worksite inefficiencies related to mobile equipment, fixed equipment, or one or more cycle times in the worksite. The worksite can be a construction site, a quarry, or another site or area associated with equipment. The equipment may include fixed equipment, such as conveyor belts, storage containers or storage locations, immobile cranes, or other equipment that does not typically move to other locations within, or outside of, the worksite. The equipment may also include mobile equipment, such as trucks, bulldozers, elevators, backhoes, or other equipment that does typically move to other locations within, or outside of, the worksite.

Equipment data is obtained from equipment associated with a worksite. The equipment data can be obtained from one or more mobile equipment, one or more fixed equipment, or some combination thereof. A representation of a current route for the mobile equipment is generated based on the equipment data. A cycle time for the worksite is generated based on the representation of the current route and the equipment data. An inefficient aspect of the worksite, the route, the mobile equipment, or the fixed equipment is identified based on the representation of the current route, the cycle time, and the equipment data. One or more recommended actions are generated to remedy the inefficient aspect.

An operating parameter of at least a portion of the mobile equipment or at least a portion of the fixed equipment is identified and caused to change based on the one or more recommended actions. In some embodiments, causing the operating parameter to change includes transmitting a message to the equipment associated with the operating parameter, which instructs the equipment to change the operating parameter.

In some embodiments, the representation of a current route is generated based on location data included in the received equipment data. Generating the representation of a current route may include generating one or more waypoints along the route. Additional representations of routes may be generated, such as, for example, different routes for different types of mobile equipment.

In some embodiments, the one or more recommended actions may be generated by using a machine learning model trained to generate recommended actions. The machine learning model may be trained to generate recommended actions based on at least one identified inefficient aspect. In some embodiments, the inefficient aspect may be identified by using a machine learning model trained to identify an inefficient aspect in a worksite. The machine learning model may be trained to identify the inefficient aspect based on one or more of a representation of a current route, a cycle time, and equipment data.

Embodiments described herein can improve the operation of the equipment, improve the cycle time in the worksite, improve worksite efficiency, or improve other aspects of the worksite or equipment associated with the worksite. Additionally, the embodiments disclosed herein may improve the functioning of the equipment, computer systems included in the equipment, or other aspects of the equipment, as a result of changing an operating parameter of the equipment. For example, changing an operating parameter of equipment to improve worksite efficiency may include changing an operating parameter of the equipment such that the functionality of a computer system associated with the equipment, or the equipment itself is improved.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The embodiments disclosed herein involve improving the "efficiency" of a worksite. The efficiency of a worksite may refer to the overall output of the worksite, the amount of time that a threshold amount of work or processes are completed at the worksite, the number of workers, equipment, or other resources used in a worksite, the environmental impact of the worksite, or other measurable aspects of the efficiency of a worksite. An improvement in the efficiency of an aspect of the worksite may include no change in the efficiency of the worksite, such as when the worksite is able to run at peak efficiency. Additionally, an improvement in the efficiency of one aspect of the worksite may include a negative effect to another aspect of the worksite or worksite efficiency, such as, for example, a change in the overall output negatively affecting the amount of time a threshold amount of work or processes are completed.

Figure 1A:
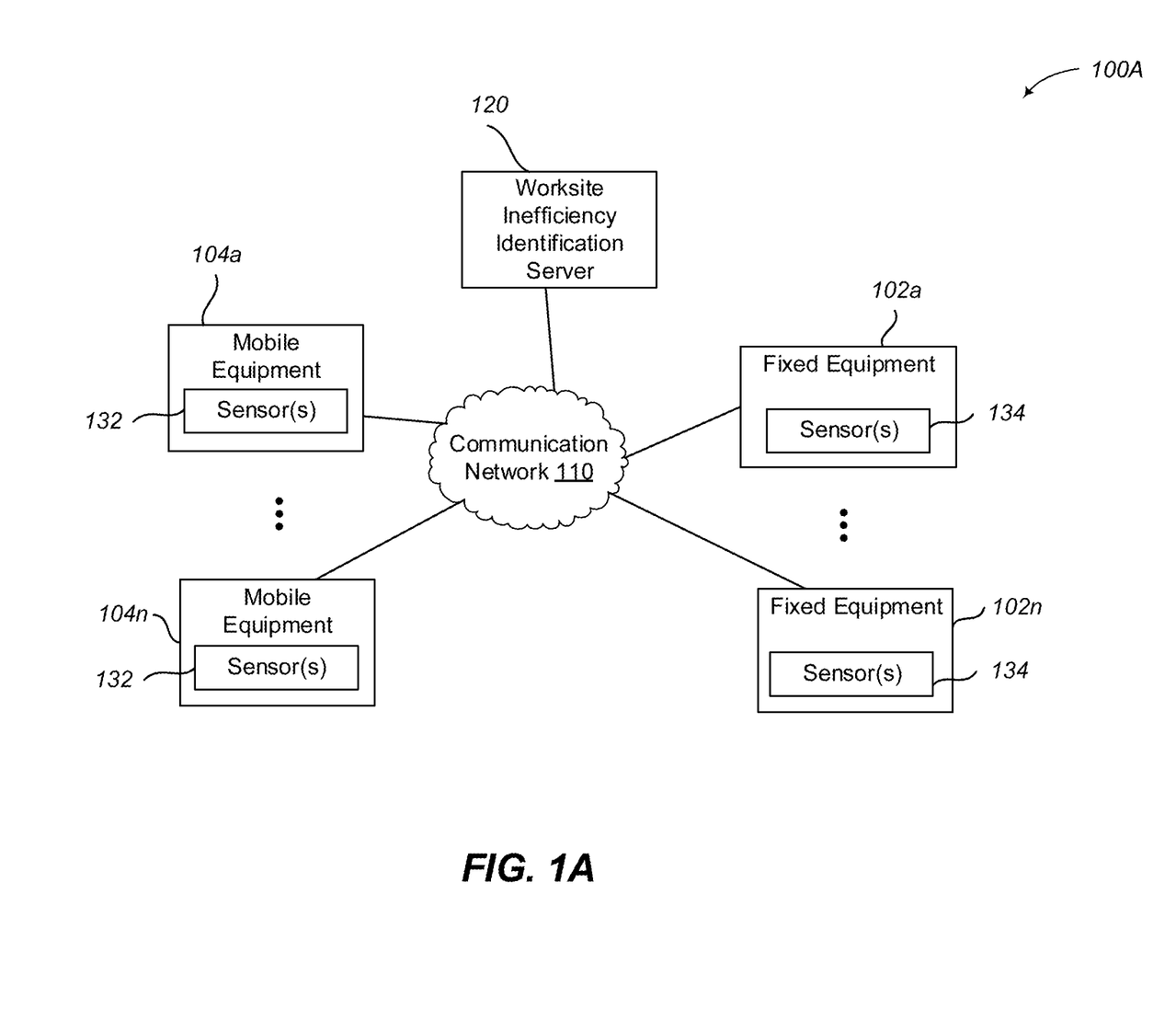
FIG. 1A illustrates a context diagram of an environment for tracking and utilizing equipment data obtained from mobile equipment and fixed equipment to identify and remedy worksite inefficiencies in accordance with embodiments described herein.

FIG. 1A illustrates a context diagram of an environment 100A for tracking and utilizing equipment data obtained from mobile equipment and fixed equipment to identify and improve or otherwise remedy worksite inefficiencies. The environment 100A includes a worksite inefficiency identification server 120, fixed equipment 102a-102n, mobile equipment 104a-104n, and a communication network 110. Although FIG. 1A illustrates two mobile equipment 104a-104n and two fixed equipment 102a-102n, embodiments are not so limited. Rather, one or more mobile equipment 104 may be included in the environment 100A. Similarly, one or more fixed equipment 102 may be included in the environment 100A. In some embodiments, either the fixed equipment 102 or the mobile equipment 104 may be optional and may not be included.

The mobile equipment 104a-104n may include mobile equipment of a variety of types which are associated with the worksite. The fixed equipment 102a-102n may include fixed equipment of a variety of types which are associated with the worksite. The mobile equipment 104 and fixed equipment 102 may be any type of equipment or machinery that is operable by a user such that the equipment's operation or performance is influenced by user input or involvement. In some embodiments, the mobile equipment 104 and fixed equipment 102 may be any type of equipment or machinery that operates automatically without user input or involvement.

In various embodiments, the mobile equipment 104a-104n may be associated with one or more sensors 132 and the fixed equipment 102a-102n may be associated with one or more sensors 134. The sensors 132 or 134 associated with equipment may be configured to obtain or captured data regarding the equipment, such as location data, equipment status data, speed or velocity data, maintenance data, or other data related to the equipment associated with the sensor (collectively "equipment data"). Examples of sensors 132 or 134 may include, but are not limited to, gyroscopes, accelerometers, onboard equipment computing systems, etc. In some embodiments, the equipment data may be received or obtained from sources other than sensor data, such as manual inspections, other equipment, equipment manuals, third-party repositories of equipment data, or other sources of data describing equipment.

The worksite inefficiency identification server 120 includes one or more computing devices that are configured to communicate with, adjust, cause to change, or otherwise manage mobile equipment 104 or fixed equipment 102, or some combination thereof. The worksite inefficiency identification server 120 may receive equipment data regarding one or more mobile equipment 102a-102n or one or more fixed equipment 104a-104n, or some combination thereof. In some embodiments, the worksite inefficiency identification server 120 receives equipment data from the equipment via the communication network 110. In other embodiments, the worksite inefficiency identification server 120 may receive equipment data from a worker or administrator via a graphical user interface. The worksite inefficiency identification server 120 analyzes the equipment data to identify equipment or worksite inefficiencies, as described herein. In some embodiments, the worksite inefficiency identification server 120 may send one or more communications messages to one or more mobile equipment 104 or fixed equipment 102 to cause change to an operating parameter of the equipment, as described herein.

Communication network 110 includes one or more wired or wireless networks in which data or communication messages are transmitted between various computing devices. The communication network 110 may be used or accessed by equipment or devices associated with the worksite, including the mobile equipment 104, fixed equipment 102, worksite inefficiency identification server 120, and any other equipment or devices associated with the worksite. The mobile equipment 104, fixed equipment 102, worksite inefficiency identification server 120, and any other equipment or device using or accessing the communication network 110 may be able to communicate with other equipment or devices that are able to use or access the communication network 110. Equipment and devices associated with a worksite may include equipment and devices that are physically located at the worksite, temporarily located at or near the worksite that interact with equipment and devices at the worksite, etc.

Figure 1B:
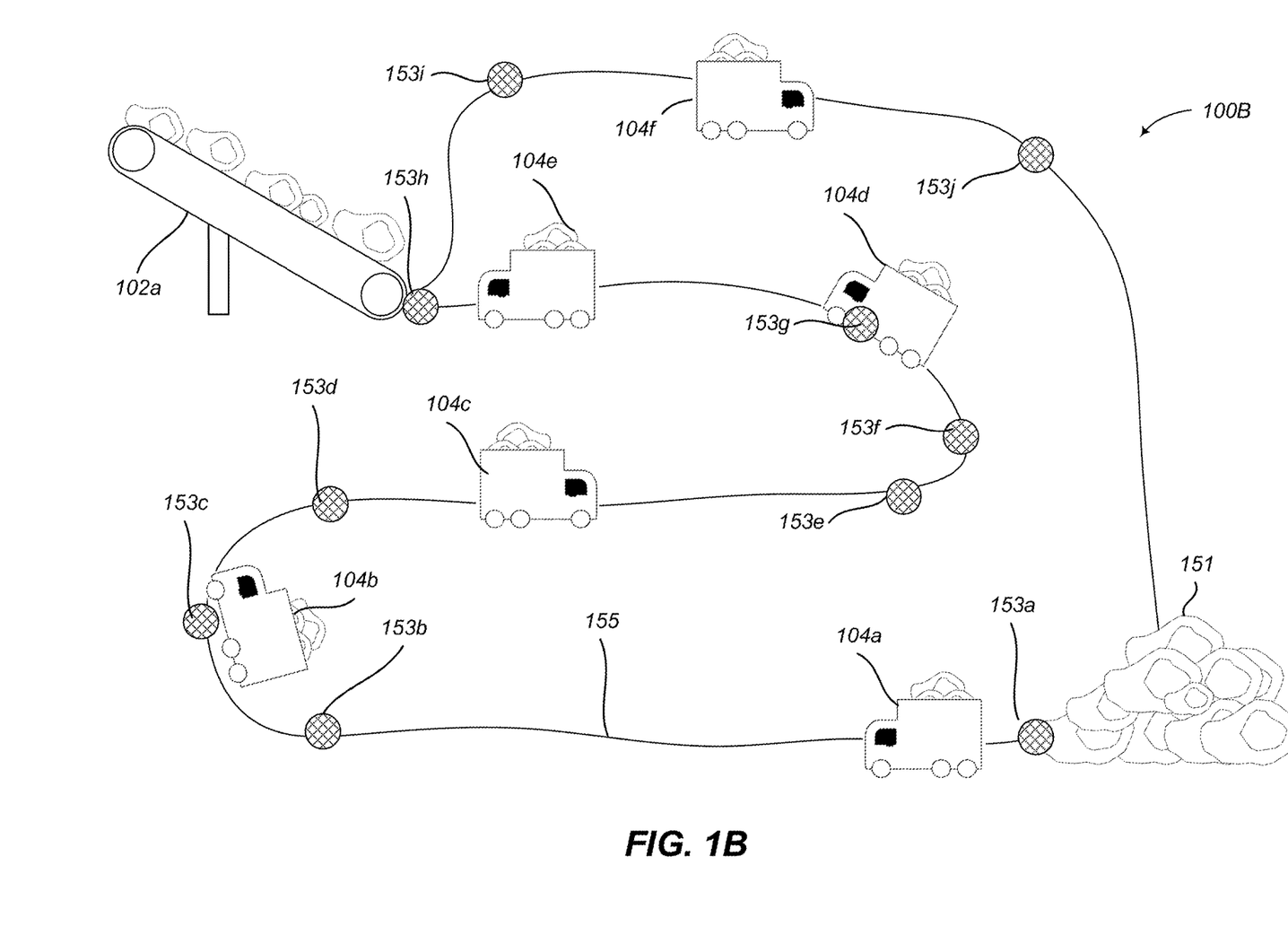
FIG. 1B is a context diagram of a non-limiting example worksite, in accordance with embodiments described herein.

FIG. 1B is a context diagram of a non-limiting example worksite 100B, in accordance with embodiments described herein. The worksite 100B includes fixed equipment 102a, mobile equipment 104a-104f, a resource 151, waypoints 153a-153j, and a route 155. In the worksite 100B, the mobile equipment 104 collect the resource 151 and travel along the route 155 through each of the waypoints 153a-153j to deliver the resource to the fixed equipment 102, and returns to the location of resource 151. The mobile equipment might be a truck, a bulldozer, a robot on a track, a pulley on a crane, a bucket to hold liquid, a grapple arm on track or equipment that can change location within the system. The resource 151 may be any resource, object, or other thing that is manipulated, changed, collected, etc., at a worksite, for example gravel, rocks, books, water, paper, cloth or other object. The fixed equipment might be a shelf, a tank to hold a liquid, a conveyor belt system, an auger, a sorting station or other equipment that is in a fixed location within the system. As mentioned in FIG. 1A, a worksite inefficiency identification server 120 identifies worksite inefficiencies from equipment data associated with equipment in a worksite. For ease of illustration, the worksite inefficiency identification server 120 is not shown in FIG. 1B. But the worksite inefficiency identification server 120 may be located or positioned at the worksite 100B or it may be remote or offsite.

The waypoints 153a-153j represent points of interest along a route, such as the route 155. A point of interest may be a change in direction along the route; a change in the speed travelled along the route, such as speeding up, slowing down, a change in a maximum speed allowed, or other changes to speed of equipment; a point where mobile equipment must stop along the route; a point where one or more routes intersect with the route; an inspection station along the route; a point where one or more sensors are placed on the route; or other points of interest in a route. A worksite inefficiency identification server, such as worksite inefficiency identification server 120 in FIG. 1A, may identify waypoints based on equipment data. In some embodiments, the worksite inefficiency identification server may use other data related to the worksite, such as sensor data from sensors associated with the worksite, but not associated with mobile equipment or fixed equipment, a map of the worksite, or other data related to the worksite (collectively "worksite data") to identify waypoints. The worksite inefficiency identification server 120 may use a representation of one or more routes to identify waypoints.

The route 155 represents a route that mobile equipment 104 takes throughout the worksite 100B. Although the worksite 100B depicts one route 155, other embodiments are not so limited, and the worksite 100B may depict additional routes. A route in a worksite may be intersected by other routes. The worksite inefficiency identification server 120 may create a representation of a route for mobile equipment to travel through the worksite. Separate routes may be travelled by the same group of mobile equipment 104 or by separate groups of mobile equipment 104. The representation of a route may be generated by using equipment data, such as location data. The worksite inefficiency identification server may use one or more identified waypoints to generate a representation of a route. In some embodiments, the worksite inefficiency identification server may use worksite data to generate a representation of a route.

In this example worksite 100B, a worksite inefficiency identification server 120 may receive data from each of the mobile equipment 104 while the mobile equipment 104 travel throughout the worksite along the route 155 and through the waypoints 153. The worksite inefficiency identification server 120 may additionally receive data from the fixed equipment 102a while the fixed equipment processes the resource 151.

Figure 2:
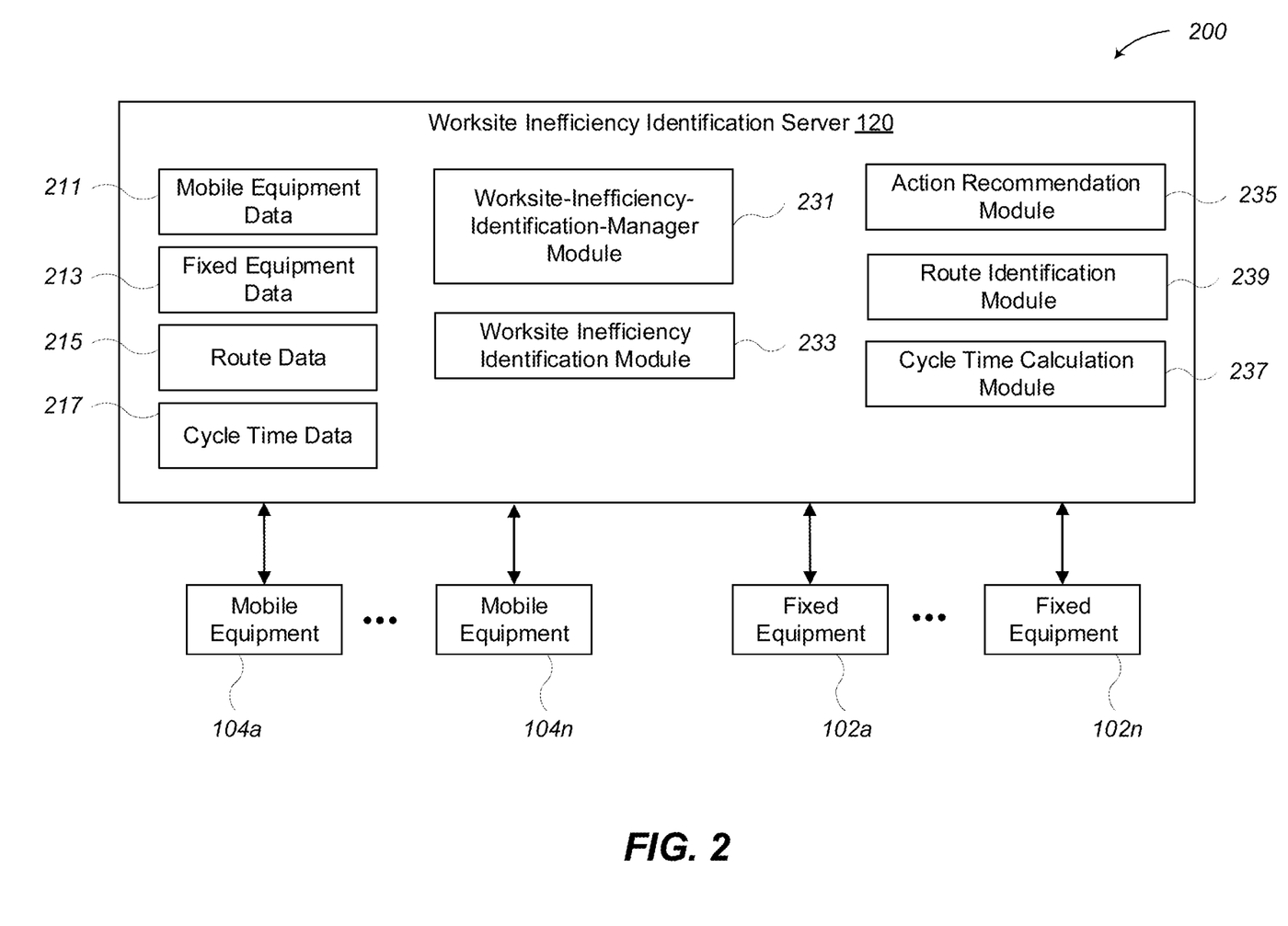
FIG. 2 is a context diagram of non-limiting embodiments of systems for receiving and utilizing equipment data to identify worksite inefficiencies in accordance with embodiments described herein.

FIG. 2 is a context diagram of non-limiting embodiments of systems for receiving and utilizing equipment data to identify worksite inefficiencies in accordance with embodiments described herein.

Example 200 includes a worksite identification server 120, fixed equipment 102a-102n, and mobile equipment 104a-104n, which are generally discussed above in conjunction with FIG. 1. In this illustrative example, the worksite inefficiency identification server 120 communicates with the mobile equipment 104 and fixed equipment 102 to identify worksite inefficiencies, generate representations of routes taken by equipment through the worksite, and generate cycle times for resources carried, processed, etc., through the worksite. Example 200 includes a worksite inefficiency identification server 120, mobile equipment 104a-104nm and fixed equipment 102a-102n which are generally discussed above in conjunction with FIGS. 1A and 1B.

The worksite inefficiency identification server 120 stores mobile equipment data 211, fixed equipment data 213, route data 215, cycle time data 217, a worksite-inefficiency-identification-manager module (a "manager module") 231, a worksite inefficiency identification module 233, an action recommendation module 235, a cycle time calculation module 237, and a route identification module 239. The worksite inefficiency identification server may additionally include worksite data (not shown).

The mobile equipment data 211 includes data associated with mobile equipment 104a-104n, such as a location, a weight, a load capacity, a size, a speed, an altitude, part status, status of the equipment, equipment type, or other types of data useful to describe mobile equipment. The mobile equipment data 211 may include data obtained from mobile equipment, such as mobile equipment 104a-104n, data obtained from other equipment related to the mobile equipment, data obtained from other data sources or repositories related to the mobile equipment, or other data associated with mobile equipment. The data included in the mobile equipment data 211 may be referred to as a plurality of mobile equipment data, first mobile equipment data, second mobile equipment data, mobile data, etc.

The fixed equipment data 213 includes data associated with fixed equipment such as a location, a weight, a load capacity, a size, an altitude, part status, status of the equipment, equipment type, or other types of data useful to describe fixed equipment. The fixed equipment data 213 may include data obtained from fixed equipment, such as fixed equipment 102a-102n, data obtained from other equipment related to the fixed equipment, data obtained from other data sources or repositories related to the fixed equipment, or other data associated with fixed equipment. The data included in the fixed equipment data 213 may be referred to as a plurality of fixed equipment data, first fixed equipment data, fixed mobile equipment data, fixed data, etc.

The route data 215 includes data associated with one or more routes generated or identified by the worksite inefficiency identification server 120, such as by using the route identification module 239. The route data 215 may include data describing one or more waypoints for one or more routes, such as route 155 shown in FIG. 1B. The route data 215 may include a representation of a route, such as a representation of a current route of mobile equipment. The representation of a route may include a list of waypoints, a visual representation of a route, a list of coordinates (e.g., a list of GPS coordinates), a three-dimensional representation of the route, or other representations of a route. Accordingly, the representation of a route may be information that defines the route for use in determining a cycle time of the route.

The cycle time data 217 includes data associated with one or more cycle times, such as the cycle times generated by the cycle time calculation module 237. The cycle time data 217 may include data describing one or more cycle times for one or more mobile equipment 104a-104n, groups of mobile equipment, types of mobile equipment, etc. The cycle time may be a measurement of how long a cycle takes to be completed, such as minutes, seconds, hours, days, or other measurements of time. A "cycle" may be completed when equipment finishes a task, when resources or equipment have traveled from one area of a worksite to another, when a resource is changed, or other when other processes or tasks are completed in the worksite. For example, a cycle may be a piece of mobile equipment moving rocks within a quarry to a piece of fixed equipment. Likewise, in another example a cycle may include processing the rocks by the piece of fixed equipment as they arrive. In another example, the cycle includes the movement of the rocks by the mobile equipment and the processing of the rocks by the fixed equipment.

The worksite-inefficiency-identification-manager module 231 manages the reception of data, operating parameters, and other data by the worksite inefficiency identification server 120. The worksite-inefficiency-identification-manager module 231 may additionally be configured to manage the transmission of data between the varying modules used by the worksite inefficiency identification server 120.

The worksite inefficiency identification module 233 is configured to use various types of data collected by the worksite inefficiency identification server 120 to identify worksite inefficiencies. The worksite inefficiency identification module may use one or more of the mobile equipment data 211, fixed equipment data 213, route data 215, and cycle time data 217 (collectively "inefficiency data") to identify one or more worksite inefficiencies. In some embodiments, the worksite inefficiency identification module 233 uses inefficiency data to generate a measurable representation of the efficiency of a worksite, or of the components of the worksite. In some embodiments, the worksite inefficiency identification module 233 uses a generated cycle time as a measurable representation of the efficiency of a worksite.

In some embodiments, the worksite inefficiency identification module 233 may compare inefficiency data or a representation of the efficiency of a first worksite to inefficiency data or a representation of the efficiency of one or more other worksites to identify one or more inefficiencies in the first worksite. The worksite inefficiency identification module may compare the inefficiency data or representations of efficiency for worksites by using statistical analysis, artificial intelligence, machine learning models, or other tools or techniques which can be used to analyze data. For example, in some embodiments, the worksite inefficiency identification module may identify one or more inefficiencies in the worksite by using a machine learning model trained to identify worksite inefficiencies based on one or more of inefficiency data and a representation of the efficiency of a worksite. The machine learning model may be trained by using at least one of: inefficiency data collected from a plurality of worksites, representations of the efficiency of a plurality of worksites, and inefficiencies identified at a plurality of worksites.

The action recommendation module 235 is configured to use an identified inefficiency to generate a recommended action to remedy the identified inefficiency. The remedy might be an improvement in the action of one or more of saving time, costs, equipment wear and tear, correcting a failure to take the action, reporting the results of the action or other improvement in any part of the cycle. The recommended action may be one action, multiple actions, or no action. The action recommendation module 235 may compare the identified inefficiency of a first worksite to one or more identified inefficiencies from one or more other worksites to generate the recommended action. The action recommendation module 235 may compare the identified inefficiencies of worksites by using statistical analysis, artificial intelligence, machine learning models, or other tools or techniques which can be used to analyze data. For example, the action recommendation module 235 may generate a recommended action by using a machine learning model trained to generate a recommended action based on an identified inefficiency. The machine learning model may be trained based on one or more identified inefficiencies and one or more recommended actions. In some embodiments, the action recommendation module 235 uses one or more of mobile equipment data, fixed equipment data, route data, and cycle time data in addition to the identified inefficiency to generate the recommended action. The machine learning model may be trained based on one or more of mobile equipment data, fixed equipment data, route data, and cycle time data in addition to the one or more identified inefficiencies and one or more recommended actions.

The route identification module 239 is configured to use equipment data, such as mobile equipment data 211, fixed equipment data 213, or both, to identify one or more routes taken by mobile equipment or resources throughout a worksite. In some embodiments, the route identification module 239 uses other data, such as worksite data, to identify the one or more routes. The route identification module 239 may receive equipment data periodically over a period of time, and may use the periodically received equipment data to generate the route. For example, the route identification module may receive location data from mobile equipment periodically during a period of time, and may use the received location data to determine routes taken by the mobile equipment throughout the construction site. Furthermore, the route identification module may receive location data from fixed equipment to determine where the fixed equipment is located in the worksite. In some embodiments, the route identification module identifies waypoints along identified routes.

The cycle time calculation module 237 is configured to use one or more generated routes, equipment data, or both, to determine a cycle time for equipment or resources located on or travelling along routes, or to determine a cycle time for individual pieces of equipment. In the case of resources, the cycle time calculation module 237 may determine the cycle time by identifying one or more resources and determining how long it takes for the resources to be processed, manipulated etc. In the case of equipment, the cycle time calculation module 237 may determine the cycle time by identifying one or more pieces of fixed equipment or mobile equipment, and determining how long it takes for the equipment to perform a task or process. In some embodiments, the cycle time calculation module 237 combines multiple cycle times, such as cycle times for a resource or equipment, to generate a cycle time for the entire worksite. In some embodiments, the cycle time calculation module 237 aggregates cycle times, such as by finding a maximum, minimum, average, mean, median, mode, etc.

Although FIG. 2 illustrates the mobile equipment data 211, the fixed equipment data 213, the route data 215, and the cycle time data 217 as being stored separately, embodiments are no so limited. Rather, one or more databases may be utilized to store the mobile equipment data 211, the fixed equipment data 213, the route data 215, and the cycle time data 217. Moreover, the mobile equipment data 211, the fixed equipment data 213, the route data 215, and the cycle time data 217 stored on the worksite inefficiency identification server 120, on a separate or remote computing device (not illustrated), or some combination thereof. Furthermore, although FIG. 2 illustrates the worksite-inefficiency-identification-manager module 231, the worksite inefficiency identification module 233, the action recommendation module 235, the cycle time calculation module 237, and the route identification module 239 as separate modules, embodiments are not so limited. Rather, one or a plurality of modules may perform the functionality of the worksite-inefficiency-identification-manager module 231, the worksite inefficiency identification module 233, the action recommendation module 235, the cycle time calculation module 237, and the route identification module 239.

The operation of certain aspects will now be described with respect to FIGS. 3-6. In at least one of various embodiments, processes 300-600 described in conjunction with FIGS. 3-6, respectively, may be executed via circuitry or implemented by or on one or more computing devices, such as the worksite inefficiency identification server 120 in FIG. 1A.

Figure 3:
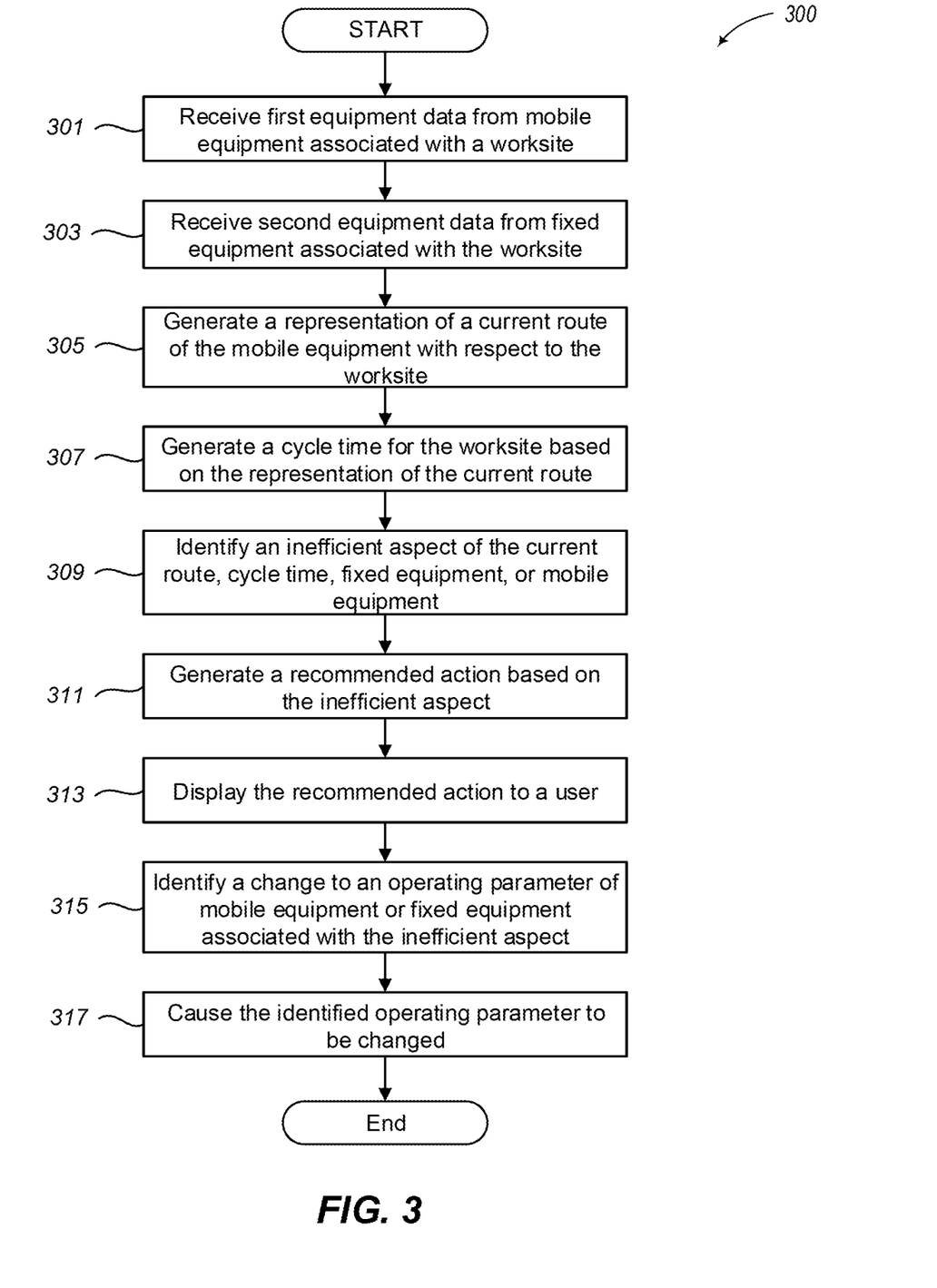
FIG. 3 illustrates a logical flow diagram showing one embodiment of a process for identifying an inefficient aspect of a worksite and causing a change to the worksite in order to address the inefficient aspect in accordance with embodiments described herein.

FIG. 3 illustrates a logical flow diagram showing one embodiment of a process 300 for identifying an inefficient aspect of a worksite and causing a change to the worksite in order to address the inefficient aspect in accordance with embodiments described herein. After a start block, process 300 begins at block 301, where the server receives first equipment data from mobile equipment associated with a worksite, such as worksite 100B in FIG. 1B. In one embodiment, the server is the worksite inefficiency identification server 120, but it can be a different server in other embodiments. At least a portion of the first equipment data may be obtained from one or more sensors included in the mobile equipment.

Process 300 proceeds to block 303, where the server receives second equipment data from fixed equipment associated with the worksite. At least a portion of the second equipment data may be obtained from one or more sensors included in the mobile equipment.

Process 300 continues at block 305, where the server generates a representation of a current route of the mobile equipment with respect to the worksite. In some embodiments, the server generates multiple representations of a current route of mobile equipment. In some embodiments, the server generates a plurality of representations of a current route for different types of mobile equipment. In some embodiments, the server generates at least one representation of a current route for resources in the worksite. In some embodiments, the server uses the process described in FIG. 4 to generate a representation of a current route.

Process 300 proceeds next to block 307, where the server generates a cycle time for the worksite based on the representation of the current route. In some embodiments, the cycle time is generated by combining multiple cycle times, such as a cycle time for mobile equipment, fixed equipment, or resources in the worksite. The server may generate the cycle time based on the representation of the current route and at least one of: the first equipment data, the second equipment data, worksite data, data describing resources in the worksite, or other data associated with the worksite. In some embodiments, the server uses the process described in FIG. 5 to generate a cycle time.

Process 300 continues at block 309, where the server identifies at least one inefficient aspect of the current route, cycle time, fixed equipment, or mobile equipment. The server may identify the inefficient aspect based on at least one of: the first equipment data, the second equipment data, cycle time data, route data, worksite data, data describing resources in the worksite, or other data associated with the worksite. In some embodiments, the server identifies the inefficient aspect by using a machine learning model trained to identify inefficient aspects in a worksite. In some embodiments, the server identifies at least one inefficient aspect by comparing data collected for the worksite, such as the first equipment data, second equipment data, cycle time data, route data, and other data collected for the worksite, to data collected from other worksites and inefficient aspects identified for the other worksites.

Process 300 proceeds next to block 311, where the server generates a recommended action based on the inefficient aspect. The server may generate a recommended action by accessing a list of recommended actions for improving identified inefficient aspects of a worksite. In some embodiments, the server generates the recommended action by using the process described in FIG. 6. In some embodiments, the server generates the recommended action by using a machine learning model trained to generate recommended actions based on an identified inefficient aspect.

Process 300 continues at block 313, where the server displays the recommended action to a user via a user interface. In some embodiments, the server does not display the recommended action to the user.

Process 300 proceeds next to block 315, where the server identifies a change to an operating parameter of mobile equipment or fixed equipment associated with the inefficient aspect. In some embodiments, at block 315, the server identifies a change to a route associated with the inefficient aspect.

Process 300 continues at block 317, where the server causes the identified operating parameter to be changed. In some embodiments, the server causes the identified operating parameter to be changed by transmitting a message to equipment associated with the operating parameter to change the operating parameter. In embodiments where the server identifies a change to a route associated with the inefficient aspect, the server may cause the route of the mobile equipment to change, such as by transmitting a message indicating a change in the route to the mobile equipment, transmitting a message indicating a change in the route to a user operating the mobile equipment, or other methods of indicating a change in a route to equipment or users of equipment.

After block 317, the process 300 ends. Although process 300 shows the inefficient aspect being related to the current route, cycle time, fixed equipment, or mobile equipment, embodiments are not so limited. In various embodiments, the inefficient aspect identified at block 309 may be related to other aspects of the worksite, such as the time that the worksite operates, the amount of fixed or mobile equipment in the worksite, the number of users operating equipment in the worksite, or other aspects of the worksite.

Figure 4:
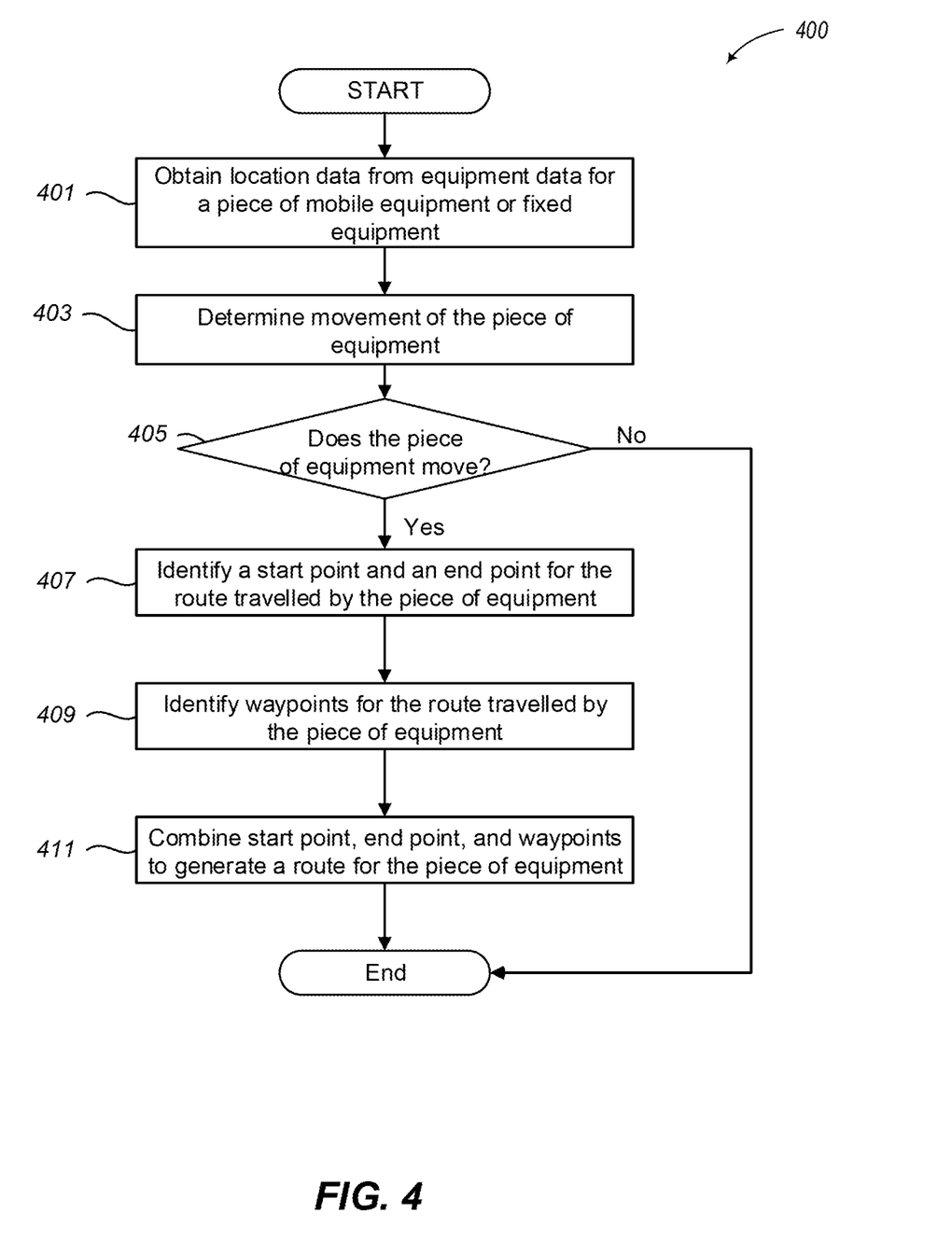
FIG. 4 illustrates a logical flow diagram showing one embodiment of a process for generating a route for a piece of equipment in accordance with embodiments described herein.

FIG. 4 illustrates a logical flow diagram showing one embodiment of a process 400 for generating a route for a piece of equipment in accordance with embodiments described herein.

After a start block, process 400 begins at block 401, where the server obtains location data from equipment data for a piece of mobile equipment or fixed equipment. The location data may include data from one or more sensors associated with the equipment, such as data from a GPS, RFID tag or antenna, or other methods of determining the location of equipment.

Process 400 proceeds to block 403, where the server determines the movement of the piece of equipment. In some embodiments, the server determines the movement of the equipment by determining whether the location data for the equipment changes over time. In such embodiments, if the location data does not change over time, the server may determine that the equipment does not move, and may determine that the equipment does move if the location data does change over time.

Process 400 continues next to decision block 405, where the server determines whether the piece of equipment moves. In various embodiments, the movement of the data may be used to label the equipment as mobile equipment, and the lack of movement by the equipment may be used to label the equipment as fixed equipment. If the piece of equipment moves, the process continue to block 407; otherwise, the process ends.

Process 400 proceeds to block 407, where the server identifies a start point and an end point for the route travelled by the piece of equipment. In some embodiments, the server identifies the start and end points based on one or more of: location data for other equipment, location data for resources, location data for points or sites of interest in the worksite, and one or more routes for equipment. For example, the server may determine that a piece of mobile equipment moves from a site that resources are located at to a piece of fixed equipment, and may determine that the location of the site with the resources is the start point and the location of the site with the fixed equipment is the end point.

Process 400 continues to block 409, where the server identifies waypoints for the route travelled by the piece of equipment. The server may identify waypoints for the route in a similar manner to identifying the start and end points of the route.

Process 400 proceeds next to block 411, where the server combines the start point, end point, and waypoints to generate a representation of a route for the piece of equipment.

After block 411, the process 400 ends or otherwise returns to a calling process to perform other actions. Although process 400 illustrates a process for determining one route for a piece of equipment, embodiments are not so limited and process 400 may be repeated to determine one or more routes for one or more pieces of equipment or for resources as they travel through the worksite.

Figure 5:
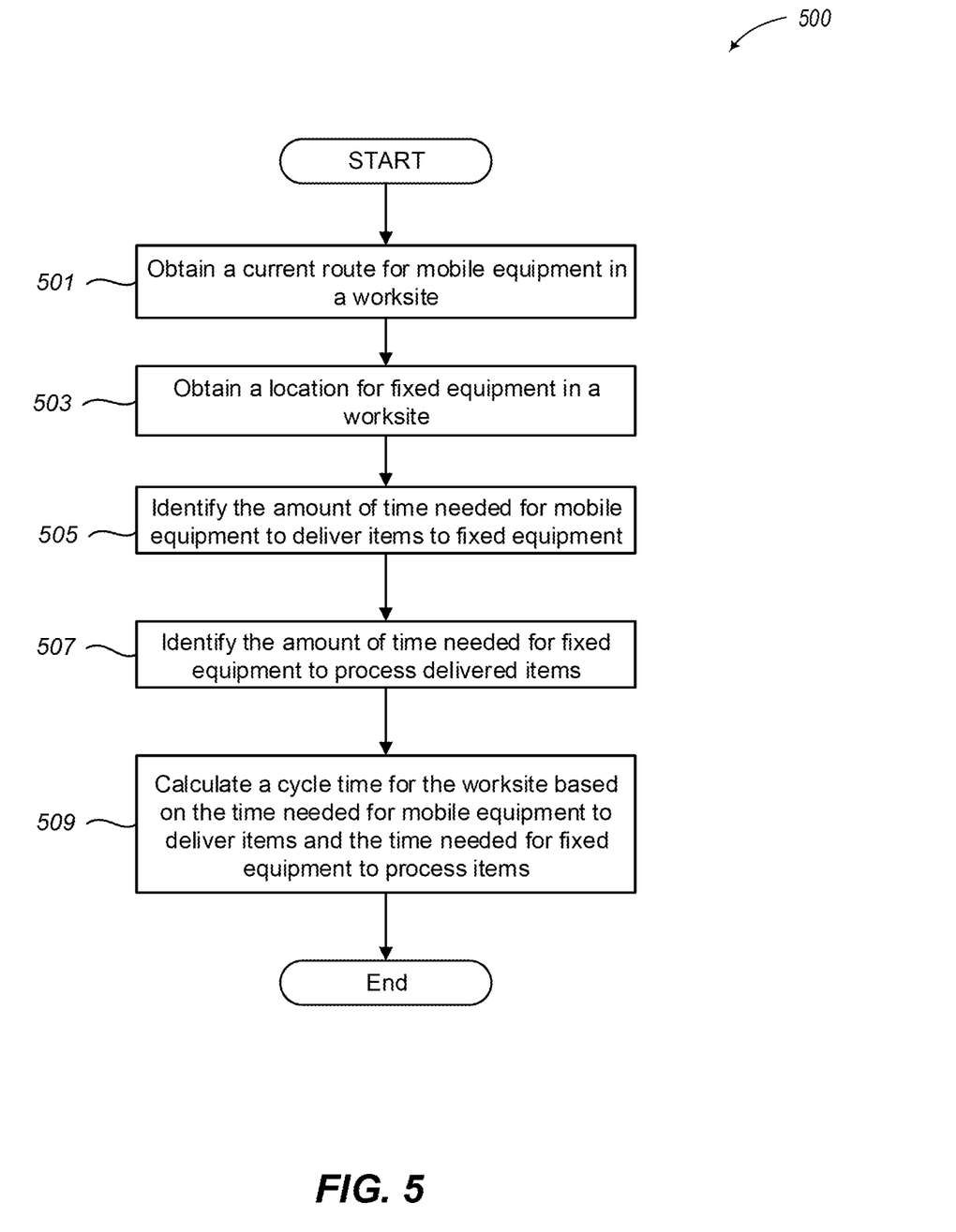
FIG. 5 illustrates a logical flow diagram showing one embodiment of a process for calculating a cycle time for equipment in a worksite in accordance with embodiments described herein.

FIG. 5 illustrates a logical flow diagram showing one embodiment of a process 500 for calculating a cycle time for equipment in a worksite in accordance with embodiments described herein.

After a start block, process 500 begins at block 501, where the server obtains a current route for mobile equipment in a worksite. In various embodiments, the server may obtain the current route from a route generated by process 400 in FIG. 4.

Process 500 continues to block 503, where the server obtains a location for fixed equipment in a worksite. The fixed equipment may be fixed equipment which the mobile equipment will travel to according to the current route. In some embodiments, the location may be for a site with resources, another piece of mobile equipment, or another location of interest in the worksite.

Process 500 continues to block 505, where the server identifies the amount of time needed for the mobile equipment to deliver items or resources to the fixed equipment. The server may identify the amount of time needed for the mobile equipment to deliver items or resources to the fixed equipment based on one or more of: equipment data for the mobile equipment, the current route of the mobile equipment, routes taken by other pieces of mobile equipment, equipment data for other mobile equipment, worksite data, and other data related to the amount of time needed for mobile equipment to transport items or resources.

Process 500 continues next to block 507, where the server identifies the amount of time needed for the fixed equipment to process the delivered items or resources. The server may identify the amount of time needed for the fixed equipment to processes the items or resources based on one or more of: equipment data for the fixed equipment, equipment data for other fixed equipment, data describing the items or resources, worksite data, and other data related to the amount of time needed for fixed equipment to transport items or resources.

Process 500 proceeds to block 509, where the server calculates a cycle time for the worksite based on the time needed for mobile equipment to deliver items or resources and the time needed for fixed equipment to process items or resources. In some embodiments, the cycle time is generated based on multiple pieces of mobile equipment and fixed equipment. In some embodiments, the cycle time is generated by using data other than data from mobile equipment and fixed equipment, such as worksite data, data regarding the resources or items at the worksite, data received from one or more sensors placed throughout the worksite, or other data related to the operation of a worksite.

After block 509, the process 500 ends or otherwise returns to a calling process to perform other actions.

Figure 6:
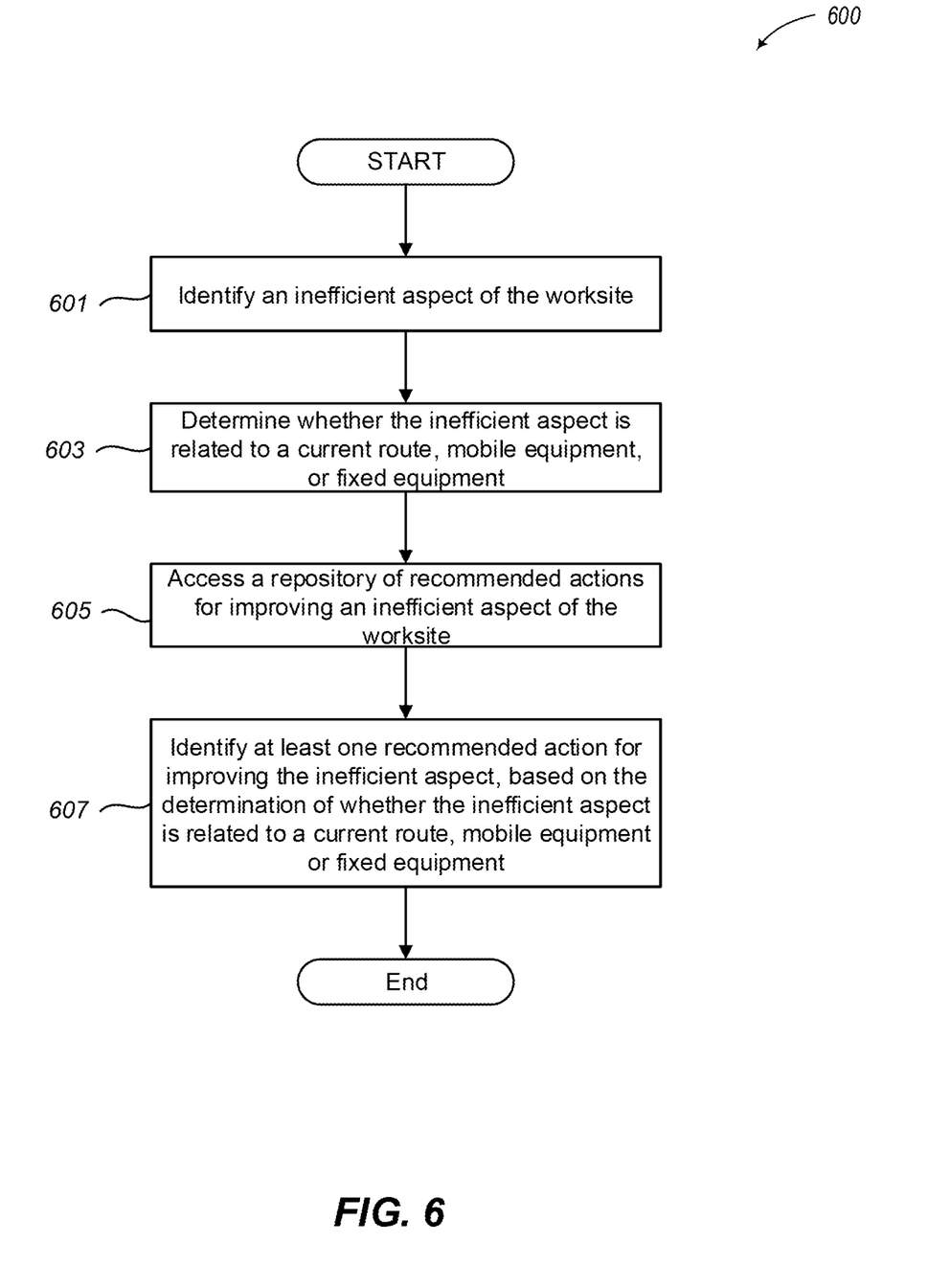
FIG. 6 illustrates a logical flow diagram showing one embodiment of a process for identifying an inefficient aspect of a worksite and identifying a recommended action for improving the inefficient aspect in accordance with embodiments described herein.

FIG. 6 illustrates a logical flow diagram showing one embodiment of a process 600 for identifying an inefficient aspect of a worksite and identifying a recommended action for improving the inefficient aspect in accordance with embodiments described herein.

After a start block, process 600 begins at block 601, where the server identifies an inefficient aspect of a worksite. The server may identify an inefficient aspect at block 601 in a similar manner as block 309. The server may use a worksite inefficiency identification module to identify the inefficient aspect.

Process 600 proceeds to block 603, where the server determines whether the inefficient aspect is related to a current route, mobile equipment, fixed equipment, or other aspects of the worksite. The server may determine which aspect of the worksite to which the inefficient aspect is related based on data describing inefficient aspects from other worksites.

Process 600 continues next to block 605, where the server accesses a repository of recommended actions for improving an inefficient aspect of the worksite. The repository of recommended actions may include historical data received from other worksites regarding actions which improved inefficient aspects of the respective worksites.

Process 600 proceeds to block 607, where the server identifies one or more recommended actions for improving the inefficient aspect based on the determination of whether the inefficient aspect is related to a current route, mobile equipment, fixed equipment, or another aspect of the worksite.

After block 607, process 600 ends or otherwise returns to a calling process to perform other actions. Although process 600 uses a repository of recommended actions to generate a recommended action, embodiments are not so limited. In some embodiments, the server uses one or more of statistical analysis, artificial intelligence, machine learning, or other data analysis tools to generate the recommended action. For example, the server may use a machine learning model trained to generate a recommended action based on one or more identified inefficient aspects to generate the recommended action. Furthermore, the server may train a machine learning model to generate a recommended action based on an identified inefficient aspect of a worksite, such as by using data obtained from the worksite and equipment in the worksite, data obtained from other worksites and equipment in other worksites, or other historical data.

Figure 7:
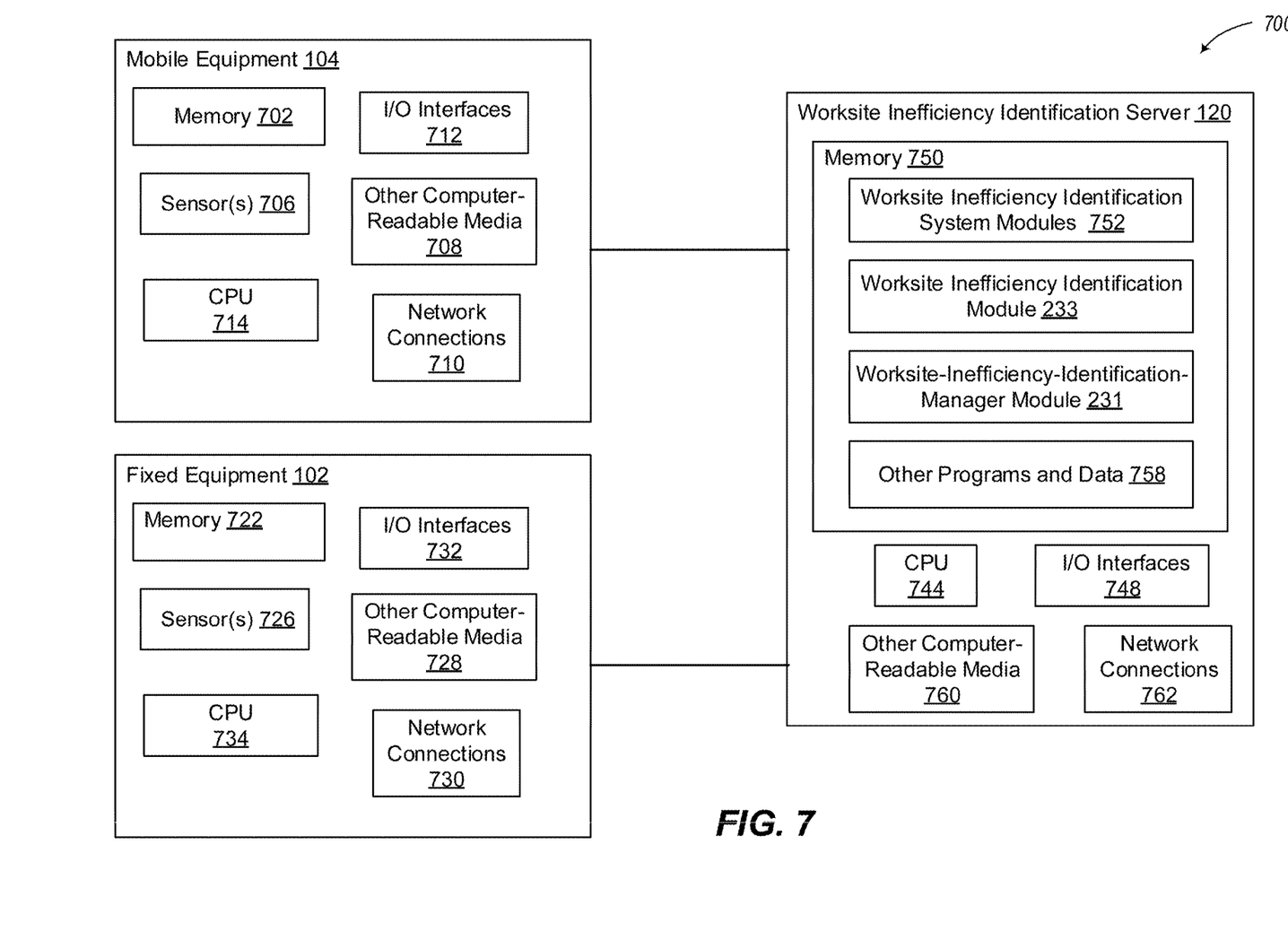
FIG. 7 shows a system diagram that describes various implementations of computing systems for implementing embodiments described herein.

FIG. 7 shows a system diagram that describes various implementations of computing systems for implementing embodiments described herein. System 700 includes a worksite inefficiency identification server 120, fixed equipment 102, and mobile equipment 104, which may communicate with one another via network 110.

The worksite inefficiency identification server 120 receives equipment data from the mobile equipment 104 and fixed equipment 102, and may transmit instructions to the mobile equipment 104 and fixed equipment 102. The worksite inefficiency identification server 120 may analyze the equipment data to identify an inefficient aspect of a worksite associated with the mobile equipment 104 and fixed equipment 102, and generate an action to remedy the identified inefficiency. In some embodiments, the worksite inefficiency identification server 120 receives sensor data from the mobile equipment 104 and fixed equipment 102 as part of the equipment data. One or more special-purpose computing systems may be used to implement the worksite inefficiency identification server 120. Accordingly, various embodiments described herein may be implemented in software, hardware, firmware, or in some combination thereof. The worksite inefficiency identification server 120 may include memory 750, one or more central processing units (CPUs) 744, I/O interfaces 748, other computer-readable media 760, and network connections 762.

Memory 750 may include one or more various types of non-volatile and/or volatile storage technologies. Examples of memory 750 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 750 may be utilized to store information, including computer-readable instructions that are utilized by CPU 744 to perform actions, including embodiments described herein.

Memory 750 may have stored thereon worksite inefficiency identification system modules 752, worksite inefficiency identification module 233, worksite-inefficiency-identification-manager module 231, and other programs and data 758. The worksite inefficiency identification system modules may include one or more of: an action recommendation module 235, a route identification module 239, and a cycle time calculation module 237, which are each described above with respect to FIG. 2. The worksite inefficiency identification module 231 and worksite-inefficiency-identification-manager module 233 are each described above with respect to FIG. 2. The other programs and data 758 may include mobile equipment data 211, fixed equipment data 213, route data 215, and cycle time data 217 which are each described above with respect to FIG. 2.

Although the worksite inefficiency identification system modules 752, worksite inefficiency identification module 233, and worksite-inefficiency-identification-manager module 231 are illustrated as separate components, embodiments are not so limited. Rather, one or more computing components or modules may be employed to perform the functionality of the worksite inefficiency identification system modules 752, worksite inefficiency identification module 233, and worksite-inefficiency-identification-manager module 231.

Memory 750 may also store other programs and data 758, which may include operating systems, equipment data, event histories for one or more users, sensor data, etc.

In various embodiments, the network connections 762 include transmitters and receivers (not illustrated) to send and receive data as described herein. I/O interfaces 748 may include a video or audio interfaces, other data input or output interfaces, or the like, which can be used to receive or output information to an administrator, among other actions. Other computer-readable media 760 may include other types of stationary or removable computer-readable media, such as removable flash drives, external hard drives, or the like.

Mobile equipment 104 and fixed equipment 102 are each pieces of equipment that may be associated with a worksite. The mobile equipment 104 and fixed equipment 102 may each include one or more sensors, such as sensors 706 and 726 respectively. The sensors may include onboard or off-board sensors tracking the current status of the equipment, the equipment load, the location of the equipment, or other data related to the mobile equipment 104 or fixed equipment 102.

The mobile equipment 104 and fixed equipment 102 each include memory, such as memory 702 and memory 722 respectively, which may store equipment data, as well as other programs or data related to the functioning of the equipment.

The mobile equipment 104 and fixed equipment 102 each include a CPU, such as CPU 714 and CPU 734, I/O interfaces, such as I/O interfaces 712 and I/O interfaces 732, other computer-readable media, such as other computer-readable media 708 and 728, and network connections, such as network connections 710 and network connections 730. The CPU included in the mobile equipment 104 and fixed equipment 102 may be similar to the CPU 744 of the worksite inefficiency identification server 120. The I/O interfaces included in the mobile equipment 104 and fixed equipment 102 may be similar to the I/O interfaces 748 of the worksite inefficiency identification server 120. The other computer-readable media included in the mobile equipment 104 and fixed equipment 102 may be similar to the other computer-readable media 760 of the worksite inefficiency identification server 120. The network connections included in the mobile equipment 104 and fixed equipment 102 may be similar to the network connections 762 of the worksite inefficiency identification server 120.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
  receiving, by a worksite inefficiency identification server, first equipment data from each of a plurality of mobile equipment associated with a worksite;
  receiving, by the worksite inefficiency identification server, second equipment data from at least one of a plurality of fixed equipment associated with the worksite;
  generating, by the worksite inefficiency identification server and based on at least the first equipment data and the second equipment data, a representation of a current route for each of the plurality of mobile equipment;
  generating, by the worksite inefficiency identification server—based on the representation of the current route, the first equipment data, and the second equipment data—a cycle time for each of the plurality of mobile equipment;
  identifying, by the worksite inefficiency identification server-based on the representation of the current route, the cycle time, the first equipment data, and the second equipment data—at least one inefficient aspect of a route, wherein the at least one inefficient aspect relates to one or more of:
    the cycle time,
    a wait time of at least one of the mobile equipment of the plurality of mobile equipment,
    operation of at least one of the mobile equipment of the plurality of mobile equipment,
    a wait time of at least one of the fixed equipment included in the plurality of fixed equipment, and
    operation of at the least one fixed equipment of the plurality of fixed equipment;
  generating, by the worksite inefficiency identification server and based on the at least one inefficient aspect, one or more recommended actions to remedy the inefficient aspect;
  identifying, by the worksite inefficiency identification server and based on the one or more recommended actions, an operating parameter of one or more of: at least one of the mobile equipment of the plurality of mobile equipment and the at least one fixed equipment of the plurality of fixed equipment; and
  causing, by the worksite inefficiency identification server and based on the one or more recommended actions, the identified operating parameter to change, including:
    determining, by the worksite inefficiency identification server, at least one equipment of the plurality of mobile equipment or the plurality of fixed equipment which is associated with the identified operating parameter; and
    transmitting, by the worksite inefficiency identification server, a message to the at least one equipment to cause the at least one equipment to change the identified operating parameter of the at least one equipment.

2. The method of claim 1, wherein identifying the at least one inefficient aspect of the route further comprises:
  applying, by the worksite inefficiency identification server, the representation of the current route, the first equipment data, the second equipment data, and the cycle time to a machine learning model trained to identify at least one inefficient aspect of the route based on the current route, the first equipment data, the second equipment data, and the cycle time; and
  obtaining, by the worksite inefficiency identification server from the machine learning model, the identified at least one inefficient aspect of the route.

3. The method of claim 1, wherein generating the one or more recommended actions further comprises:
  applying, by the worksite inefficiency identification server, the identified at least one inefficient aspect to a machine learning model trained to generate one or more recommended actions based on at least one identified inefficient aspect; and
  obtaining, by the worksite inefficiency identification server from the machine learning model, the recommended one or more actions.

4. The method of claim 1, wherein generating the representation of the current route further comprises:
  obtaining, by the worksite inefficiency identification server, first location data from the first equipment data;
  obtaining, by the worksite inefficiency identification server, second location data from the second equipment data; and
  generating, by the worksite inefficiency identification server, the representation of a current route based on the first location data and the second location data.

5. The method of claim 4, wherein generating the representation of the current route further comprises:
  identifying, by the worksite inefficiency identification server, one or more waypoints along the current route based on the representation of the current route, the first equipment data, and the second equipment data.

6. The method of claim 1, wherein identifying the at least one inefficient aspect of the route further comprises:
  identifying, by the worksite inefficiency identification server, at least one inefficient aspect of the route and the plurality of mobile equipment.

7. The method of claim 1, wherein identifying the at least one inefficient aspect of the route further comprises:
  identifying, by the worksite inefficiency identification server, at least one inefficient aspect of the route and the plurality of fixed equipment.

8. The method of claim 1, further comprising:
displaying, via a user interface, the identified at least one inefficient aspect and the one or more recommended actions to remedy the inefficient aspect.

* * * * *